United States Patent Office 3,152,146
Patented Oct. 6, 1964

3,152,146
HALOGENATED o-PHENYLENE CARBONATES
Joseph Willard Baker, Kirkwood, and Raymond Eugene
Stenseth, Webster Groves, Mo., assignors to Monsanto
Company, a corporation of Delaware
No Drawing. Filed May 8, 1963, Ser. No. 279,019
7 Claims. (Cl. 260—340.2)

This invention relates to a novel class of halophenyl carbonates. More particularly, this invention is concerned with a class of new organic compounds which are halogenated o-phenylene carbonates. Such carbonates are found to possess useful and unexpected biological activity.

The novel compounds of this invention have the general formula,

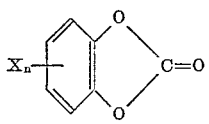

where X is selected from the group consisting of chlorine and bromine, and n is an integer from 2 to 4.

This novel class of compounds can be prepared by causing a halogenated catechol to react with phosgene to produce the desired carbonate. In such reactions, it is preferred to add a tertiary amine to the reaction mixture to serve as an acceptor for the hydrogen chloride formed during the reaction. Examples of tertiary amines which can be used are quinaldine, triethylamine, dimethylaniline, diethylaniline, pyridine, and the like. An exemplary reaction utilizing an imine acceptor can be illustrated as follows:

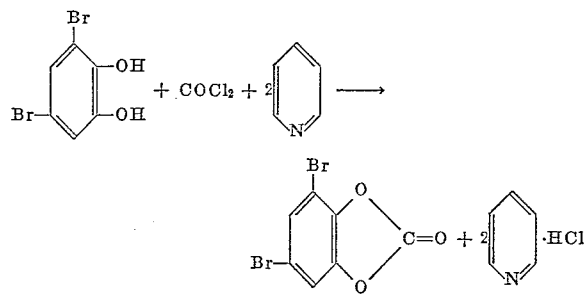

In practicing the preparation of such an equation, it is also preferred to use an inert organic solvent for the catechol. Among the suitable solvents are benzene, toluene, xylene, hexane, heptane, octane, propyl ether, ethyl ether, tetrahydrofuran, dioxane, and the like. The reaction temperatures employed in preparing the new compounds will depend upon the particular reactants utilized to obtain a desired end product.

It should be noted that, although both are preferred, neither the tertiary amine nor the inert organic solvent is essential to the preparation of the compounds of this invention. In the absence of such amine, the hydrogen chloride which forms during the reaction can be boiled off.

The invention will be more fully understood by reference to the following examples, which are set forth herein solely for the purpose of illustration and are not to be construed as limiting the scope of the present invention.

Example 1

A suitable reaction vessel is charged with 12.4 grams (0.05 mol) of tetrachlorocatechol and 7.9 grams (0.1 mol) of pyridine in 400 ml. of benzene. The resulting solution is cooled to 5–10° C. and stirred during the subsurface addition of 5.0 grams (0.05 mol) of phosgene over a period of 10 minutes. The mixture is permitted to come to room temperature and is stirred for 1.5 hours. It is then filtered and washed with benzene, after which the solid is dried. The filtrate and combined washings are evaporated to remove the benzene, leaving a white solid product. Said product is twice recrystallized from methylcyclohexane to yield 7.5 grams of tetrachloro-o-phenylene carbonate as white crystals showing a M.P. of 172–173° C. Analysis shows 30.7% carbon and 52.1% chlorine as against calculated values of 30.77% and 51.8%, respectively, for $C_7Cl_4O_3$.

Example 2

In a suitable reaction vessel, 17.8 grams (0.05 mol) of 3,4,5-tribromocatechol is substituted for the tetrachlorocatechol of Example 1, and the detailed procedure set forth therein is followed. There is obtained 3,4,5-tribromo-o-phenylene carbonate in good yield.

Example 3

A suitable reaction vessel is charged with 8.9 grams (0.05 mol) of 4,5-dichlorocatechol and 7.9 grams (0.05 mol) of pyridine in 400 ml. of benzene. The reaction mixture is cooled to 10° C. and stirred while 5.0 grams (0.05 mol) of phosgene is added subsurface over a period of about 10 minutes. The reaction mixture is then allowed to come to room temperature, and the stirring is continued for about 90 minutes. It is then filtered, and the filtrate is extracted with water. The organic fraction is evaporated, and the residue is dissolved in methylcyclohexane. Cooling produces fine needles, M.P. 70–73° C., which, after several recrystallizations from methylcyclohexane, yield 7.5 grams of 4,5-dichloro-o-phenylene carbonate as fine needles, M.P. 76–77° C. Analysis shows 34.9% chlorine as against a calculated value of 34.6% for $C_7H_2Cl_2O_3$.

Example 4

In a suitable reaction vessel, 3,5-dichlorocatechol is substituted for the 4,5-isomer of Example 3, and the detailed procedure set forth in said example is followed. There is obtained 3,5-dichloro-o-phenylene carbonate in good yield.

The products of the present invention are useful as microbiocides adapted to be employed for the control of bacterial and fungal organisms. In a representative test, tetrachloro-o-phenylene carbonate is active against *Staphylococcus aureus* at a dilution of at least one part per million, and against *Aspergillus niger* at a dilution of at least one part per one hundred thousand. Similar results are obtained with the other compounds of this invention.

While the invention has been described with respect to certain specific embodiments, it is not so limited. It is to be understood that variations and modifications thereof may be made without departing from the spirit and scope of this invention.

The embodiments of the invention in which an exclusive property or privilege is claimed are defined as follows:

1. A compound of the formula,

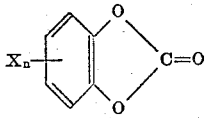

where X is selected from a group consisting of chlorine and bromine, and $n$ is an integer from 2 to 4.

2. A compound of the formula,

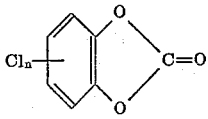

where $n$ is an integer from 2 to 4.

3. A compound of the formula,

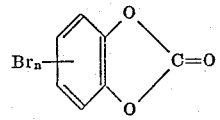

where $n$ is an integer from 2 to 4.

4. Tetrachloro-o-phenylene carbonate.
5. 3,4-dichloro-o-phenylene carbonate.
6. 3,5-dichloro-o-phenylene carbonate.
7. 3,4,5-tribromo-o-phenylene carbonate.

No references cited.